(12) United States Patent
Sahinoglu et al.

(10) Patent No.: US 7,436,909 B2
(45) Date of Patent: Oct. 14, 2008

(54) METHOD FOR ESTIMATING TIME OF ARRIVAL OF RECEIVED SIGNALS FOR ULTRA WIDE BAND IMPULSE RADIO SYSTEMS

(75) Inventors: Zafer Sahinoglu, Somerville, MA (US); Sinan Gezici, Princeton, NJ (US); Andreas F. Molisch, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 610 days.

(21) Appl. No.: 10/988,764

(22) Filed: Nov. 15, 2004

(65) Prior Publication Data

US 2006/0104387 A1 May 18, 2006

(51) Int. Cl.
*H04L 27/06* (2006.01)
(52) U.S. Cl. .................. 375/340; 375/139; 375/340; 370/319; 370/330; 370/342; 342/150; 455/502
(58) Field of Classification Search .............. 375/139, 375/340; 370/319, 330, 342; 342/150; 455/502
See application file for complete search history.

(56) References Cited

U.S. PATENT DOCUMENTS 6,628,697 B1 *  9/2003  Douglas et al. ............. 375/139
7,039,000 B2 *  5/2006  You et al. .................... 370/203
2003/0231719 A1 * 12/2003  Wreschner et al. .......... 375/340
2004/0176119 A1    9/2004  Molisch et al.
2005/0184908 A1 *  8/2005  Richards ..................... 342/458
2008/0063036 A1 *  3/2008  Richards et al. ............. 375/150

OTHER PUBLICATIONS

Kegen Yu et al: "UWB positioning for 1-5 wireless embedded networks" Radio and Wireless Conference, 2004 IEEE Atlanta, GA, USA Sep. 19-22, 2004, Piscataway, NJ, USA, IEEE, Sep. 19, 2004, pp. 459-462.
Gezici, S. Zhi Tian Giannakis, G.B. Kobayashi, H. Molisch, A.F. Poor, H.V. Sahinoglu, Z. : "Localization via ultra-wideband radios: a look at positioning aspects for future sensor networks" IEEE Signal Processing Magazine, Jul. 2005, pp. 70-84.

* cited by examiner

*Primary Examiner*—Shuwang Liu
*Assistant Examiner*—Helene Tayong
(74) *Attorney, Agent, or Firm*—Dirk Brinkman; Clifton D. Mueller; Gene V. Vinokur

(57) ABSTRACT

A method estimates a time of arrival of a signal received in a wireless communication system. An energy in a frame of a received signal is measured to determine a block in the frame, the block representing a coarse time of arrival of the received signal. Multiple time-delayed versions of a template signal are combined with the block of the received signal to select a particular template signal. The particular template signal identifies a particular chip representing a fine time of arrival of the received signal.

8 Claims, 4 Drawing Sheets

200

400

METHOD FOR ESTIMATING TIME OF ARRIVAL OF RECEIVED SIGNALS FOR ULTRA WIDE BAND IMPULSE RADIO SYSTEMS

FIELD OF THE INVENTION

The present invention relates generally to radio communication systems, and more particularly to determining a time of arrival of a received signal in a wireless communications network.

BACKGROUND OF THE INVENTION

To estimate a distance between a transmitter and a receiver in a wireless communications network, the transmitter can send a signal to the receiver at a time $t_1$. The receiver, as soon as possible, returns a reply signal to the transmitter. The transmitter measures the time of arrival (TOA) of the reply signal at time $t_2$. An estimate of the distance between the transmitter and the receiver is the time for the signal to make the round trip divided by two and multiplying by the speed of light, i.e.:

$$D = \frac{|t_1 - t_2|}{2} c.$$

Accurate time resolution of ultra wideband (UWB) signals facilitates very precise positioning capabilities based on signal TOA measurements. Although a theoretical lower bound for TOA estimation can be achieved by using maximum likelihood methods, those prior art methods are impractical due to a need for extremely high sampling rates and a large number of multipath components of the signal.

Another method is correlation-based. That method serially searches possible signal delays of a signal received via a first signal path and takes a very long time to estimate the TOA of the received signal.

Moreover, the signal received from the first path does not always have a strongest correlation output, which can result in an inaccurate TOA estimate by the prior art correlation-based methods.

Therefore, there is a need for a time of arrival estimation method that overcomes the problems of the prior art.

SUMMARY OF THE INVENTION

The invention provides a method for estimating a time of arrival of a signal received in a wireless communication system. An energy in a frame of a received signal is measured to determine a block in the frame, the block representing a coarse time of arrival of the received signal. Time-delayed versions of a template signal are combined with the block of the received signal to select a particular template signal. The particular template signal identifies a particular chip representing a fine time of arrival of the received signal.

DETAILED DESCRIPTION OF THE PREFERRED EMBODIMENT

System Structure and Method Operation

Our invention provides a method for estimating a time of arrival (TOA) of a signal at a radio transceiver in a wireless communications network. For the purpose of this description, the transceiver estimates the TOA for a received signal. However, it should be understood that the transceiver can transmit and receive.

Figure 1:
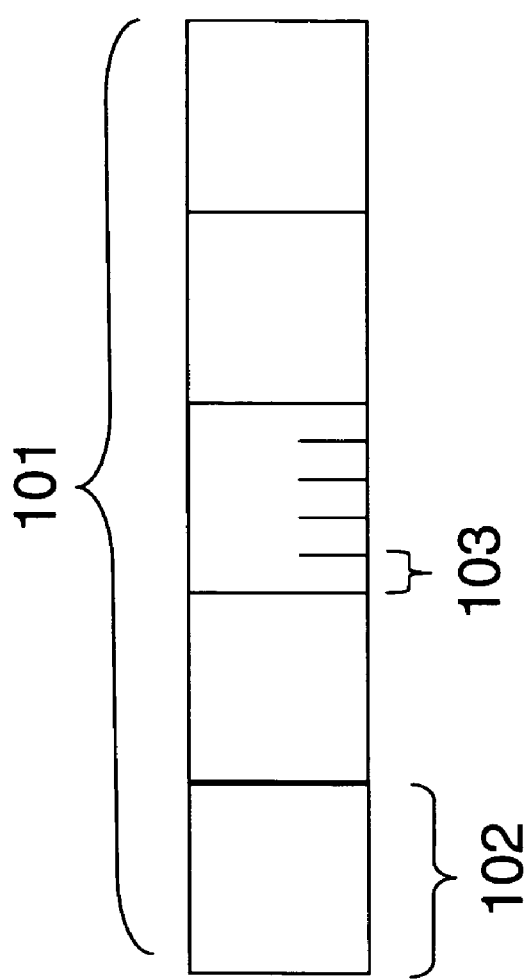
FIG. 1 is a block diagram of frame-based time intervals.

As shown in FIG. 1, wireless impulse radio transceivers mark time in terms of frames 101, blocks 102, and chips 103. Frames are longer than blocks, which are longer than chips. Each frame includes multiple blocks. Each block includes multiple chips.

A binary phase shift keying (BPSK) time hopping (TH) impulse radio (IR) transmitted signal can be represented by:

$$s_{tx}(t) = \sqrt{E} \sum_{j=-\infty}^{\infty} a_j b_{\lfloor j/N_f \rfloor} w_{tx}(t - jT_f - c_j T_c), \quad (1)$$

where $w_{tx}(t)$ is a transmitted ultra wideband (UWB) pulse having a duration $T_c$, E is a transmitted pulse energy, $T_f$ is a frame time, $N_f$ is a number of pulses representing one information symbol, $T_s = N_f T_f$ is a symbol interval, and $b_{\lfloor j/N_f \rfloor} \in \{+1, -1\}$ is a binary information symbol. In order to smooth a power spectrum of the transmitted signal and to allow the channel to be shared by multiple users without causing collisions, a time-hopping (TH) sequence $c_j \in \{0, 1, \ldots, N_c - 1\}$ is assigned to each transmitter, where $N_c$ is the number of chips per frame interval, that is, $N_c = T_f = T_c$.

Additionally, random polarity codes, $a_j$'s, can be included. The polarity codes are binary random variables taking values ±1 with equal probability. The values are known at the receiver.

Consider the following channel model $$r(t) = \sum_{l=1}^{L} \sqrt{E} \, \alpha_l s_{rx}(t - (l-1)T_c - \tau_{TOA}) + n(t), \quad (2)$$

where $a_l$ is a channel coefficient for an $l^{th}$ path, L is a number of multipath components, and $\tau_{TOA}$ is a TOA of the received signal. From equations (1) and (2), and considering effects of antennas, the received signal can be represented by:

$$r(t) = \sum_{l=1}^{L} \sqrt{E} \, \alpha_l s_{rx}(t - (l-1)T_c - \tau_{TOA}) + n(t), \quad (3)$$

where $s_{rx}(t)$ is given by $$s_{rx}(t) = \sum_{j=-\infty}^{\infty} a_j b_{\lfloor j/N_f \rfloor} w_{rx}(t - jT_f - c_j T_c), \quad (4)$$

with $w_{rx}(t)$ denoting the received UWB pulse with unit energy. Assuming a data aided TOA estimation method using a training sequence, we consider a training sequence of $b_j = 1 \forall j$.

In this case, equation (4) can be expressed as $$s_{rx}(t) = \sum_{j=-\infty}^{\infty} a_j w_{rx}(t - jT_f - c_j T_c) \quad (5)$$

For simplicity, we assume that the signal always arrives in one frame duration, i.e., $\tau_{TOA} < T_f$, and there is no inter-frame interference (IFI); that is, $T_f \geq (L + c_{max})T_c$ or, equivalently, $N_c \geq L + c_{max}$, where $c_{max}$ is a maximum value of the TH sequence. Note that the assumption of $\tau_{TOA} < T_f$ does not restrict the invention. In fact, it is enough to have $\tau_{TOA} < T_s$ for the invention to work when the frame is sufficiently large and predetermined TH codes are used.

Moreover, even if $\tau_{TOA} < T_s$, an initial energy detection can be used to determine the arrival time within a symbol uncertainty.

Two Step TOA Estimation Method

One of the most challenging tasks in time of arrival estimation is to obtain a reliable TOA estimate in an acceptable time interval under the constraint of sampling rate. In order to have a low power and low complexity receiver, we use symbol-rate sampling in our preferred embodiment.

The invention provides a method for estimating a TOA that can perform TOA estimation from symbol-rate samples in less time than prior art methods, and at chip-level resolution.

Figure 2:
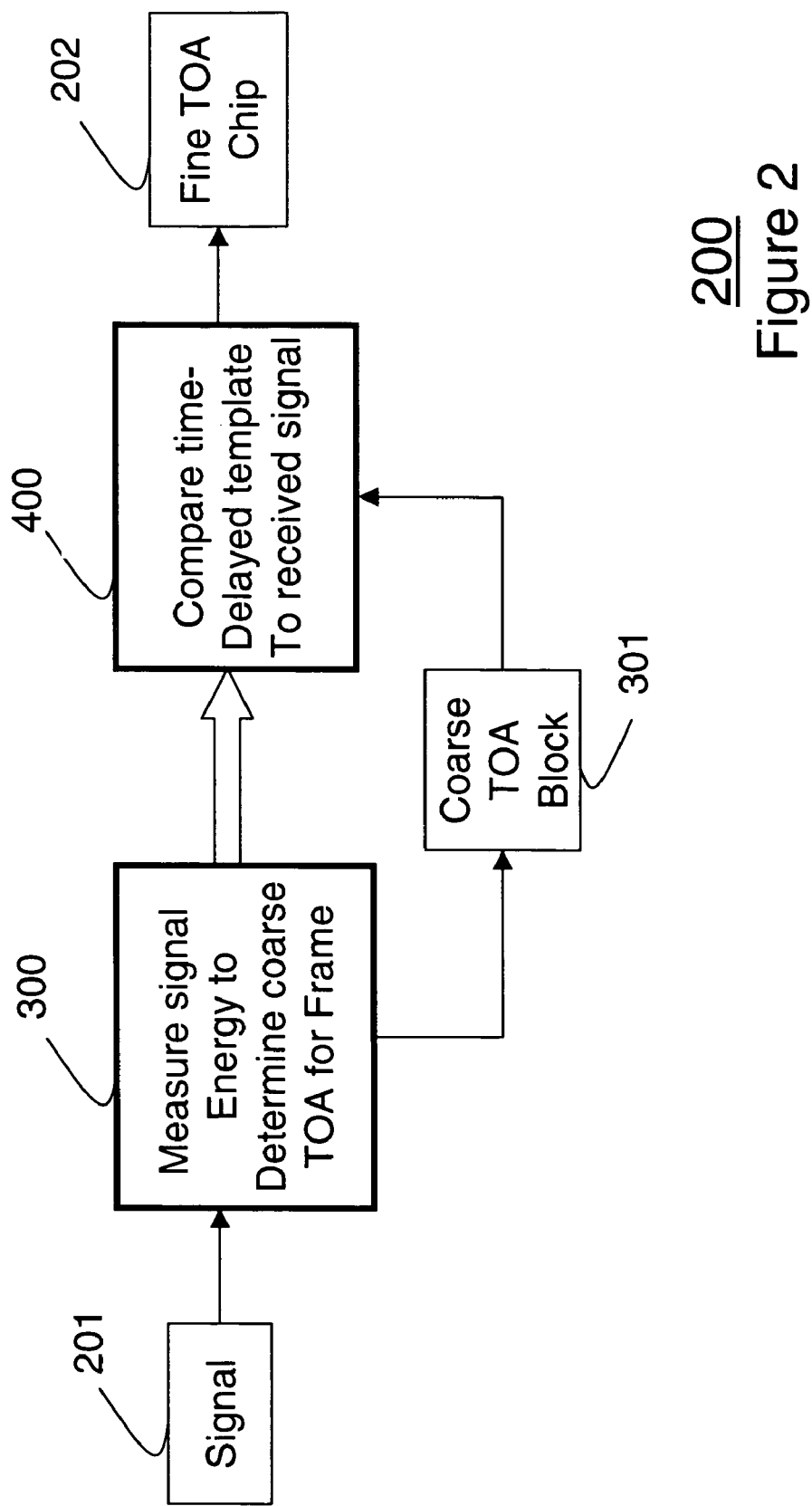
FIG. 2 is a flow diagram of the method for estimating a time of arrival according to the invention.

As shown in FIG. 2, the invention estimates 200 a TOA of a received signal 201 at a particular chip 202 of a particular block 301 in a frame.

A first step according to the invention determines 300 a block representing a coarse TOA 301 of the received signal 201 based on a signal measurement of energy of the received signal.

Figure 3:
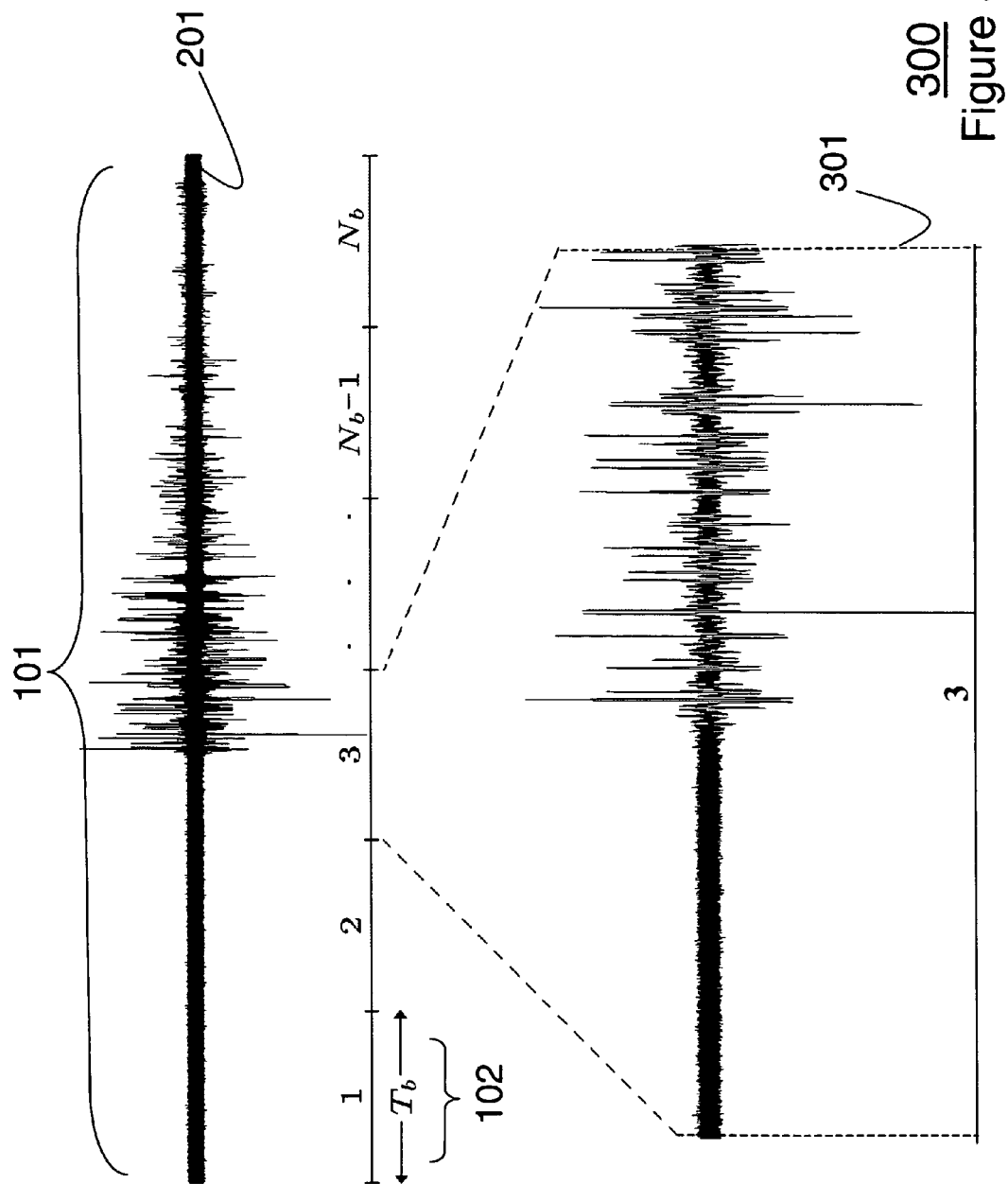
FIG. 3 is a block diagram of determining a coarse time of arrival of a received signal according to the invention.

As shown in FIG. 3, the signal 201 received during a frame 101 with $N_b$ blocks 102 has a highest measured energy during a third block 301. Therefore, the coarse time of arrival is determined to be during the third block 301.

In a second step, a fine time of arrival 202 of the received signal is estimated by applying a change detection method 400, which combines multiple, time-delayed versions of a template signal to the received signal to identify a fine time of arrival 202. The template signals are transmitted signals corresponding to the received signal. In the preferred embodiment, the time delays are one-chip intervals.

Figure 4:
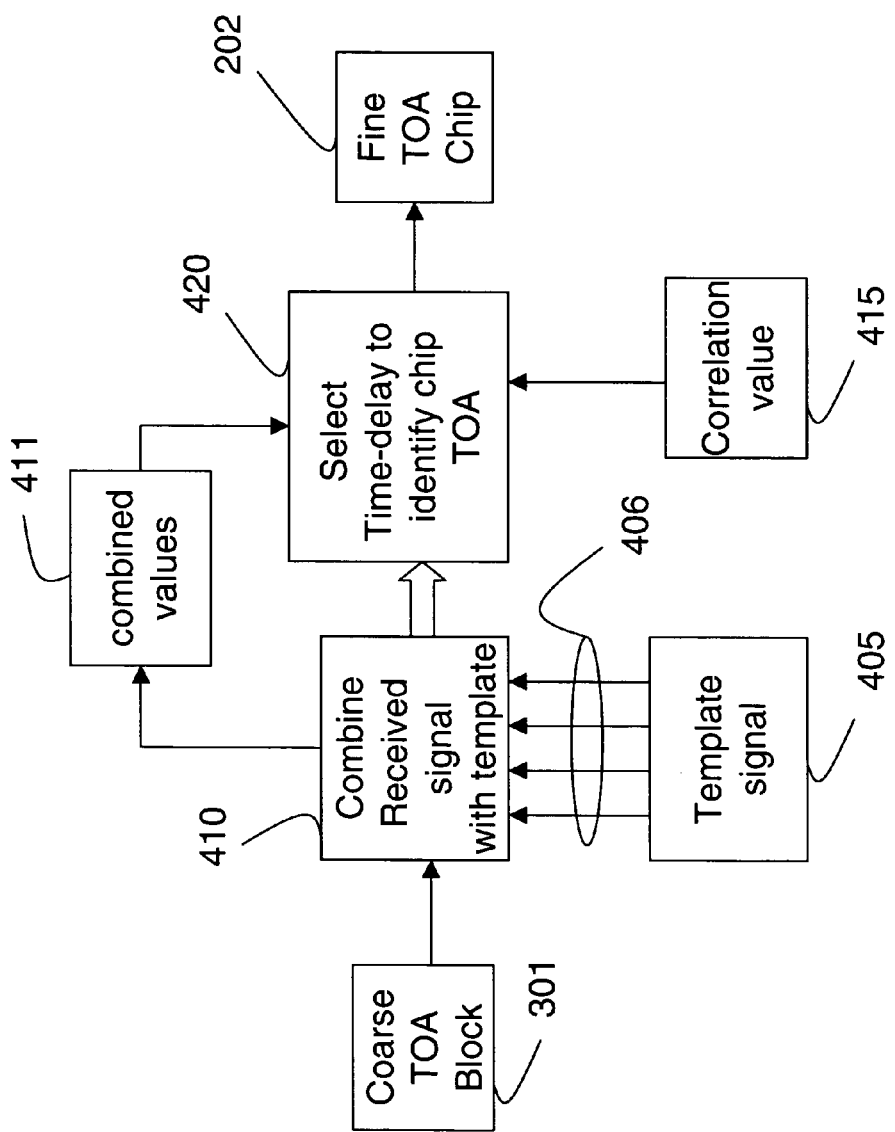
FIG. 4 is a flow diagram for determining a fine time of arrival of a received signal according to the invention.

FIG. 4 illustrates the change detection method 400 for determining the fine TOA 202 according to the invention.

As shown in FIG. 4, after the third block 301 is determined, the received signal is combined 410 with each of multiple, time-delayed versions 406 of the template signal 405 according to the block 301. The combining 410 produces a set of combined values 411, one for each combination of a time-delayed template with the received signal. The template signal associated with a combined value that matches a correlation value 415 is selected 420 to identify the chip that represents the fine TOA 202.

We express the TOA ($\tau_{TOA}$) in equation (3) as follows:

$$\tau_{TOA} = kT_c = k_b T_b + k_c T_c \quad (6)$$

where $k \in [0, N_c-1]$ is the TOA in terms of the chip interval $T_c$, $T_b$ is the block interval including B chips ($T_b = BT_c$), and $k_b \in [0, N_c/B-1]$ and $k_c \in [0, B-1]$ are integers that determine, respectively, in which block and chip the signal arriving via the first signal path.

For simplicity, the TOA is assumed to be an integer multiple of the chip duration $T_c$. In a practical application, sub-chip resolution can be obtained by employing a delay-lock-loop (DLL) after the TOA estimation with chip-level uncertainty.

Coarse TOA Estimation

As shown in FIG. 3, the coarse arrival time of the signal in the frame interval is determined 300, i.e., which block in the frame represents the arrival time of the received signal, e.g. a UWB pulse. Without loss of generality, we assume that the frame time $T_f$ is an integer multiple $N_b$ of block size $T_b$, i.e., $T_f = N_b T_b$. In order to have reliable decision variables in this step, energies from $N_1$ different frames of the incoming signal for each block can be combined. Hence, the decision variables are expressed as $$Y_i = \sum_{j=0}^{N_1 - 1} Y_{i,j}, \quad (7)$$

for $i = 0, \ldots, N_b - 1$, where $$Y_{i,j} = \int_{jT_f + iT_b + c_j T_c}^{jT_f + (i+1)T_b + c_j T_c} |r(t)|^2 dt. \quad (8)$$

Then, $k_b$ in (6) is estimated as $$\hat{k}_b = \arg \max_{0 \leq i \leq N_b - 1} Y_i. \quad (9)$$

In other words, we select the block with the largest signal energy.

The parameters of this step that can be optimized are the block size $T_b(N_b)$ and the number of frames $N_1$, from which energy is measured.

Fine TOA Estimation from Low Rate Correlation Outputs

After determining the coarse arrival time, the second step estimates the fine TOA $k_c$ according to equation (6). Ideally, chips $k_c \in [0, B-1]$ need to be searched for fine TOA estimation, which corresponds to searching $k \in [\hat{k}_b B, (\hat{k}_b + 1)B - 1]$, with chips $\hat{k}_b$ determined from equation (9).

However, in some cases, the first signal path can be in one of the blocks preceding the block having the highest energy level due to multipath effects. Therefore, instead of searching a single block, multiple blocks $k \in [\hat{k}_b B - M_1, (\hat{k}_b + 1)B - 1]$, with $M_1 \geq 0$, can be searched for the fine TOA in order to increase the probability of detecting of a first path of the received signal. In other words, in addition to the block with the largest signal energy, we perform an additional search over $M_1$ chips by applying templates with relatively long time delays.

For notational simplicity, let $U = \{n_s, n_s + 1, \ldots, n_e\}$ denote an uncertainty region, i.e., possible TOA of the first path of the received signal, where $n_s = \hat{k}_b B - M_1$ and $n_e = (\hat{k}_b + 1)B - 1$ are the start and end points of the uncertainty region in the frame.

In order to estimate the fine TOA, i.e., a TOA at a chip-level resolution, we consider combinations of the received signal with time-shifted versions 406 of the template signal 405. For delay $iT_c$, we obtain the following output:

$$z_i = \int_{iT_c}^{iT_c + N_2 T_f} r(t) s_{temp}(t - iT_c) dt, \quad (10)$$

where $N_2$ is the number of frames over which the combination output is obtained, and $s_{temp}(t)$ is the template signal given by $$s_{temp}(t) = \sum_{j=0}^{N_2-1} a_j w(t - jT_f - c_j T_c). \quad (11)$$

From the combination outputs for different delays, the object is to determine the chip in which the first signal path has arrived. According to the block interval $T_b$ and considering the multipath components in the received signal, which is typical for indoor UWB systems, we can assume that the block starts with a number of chips with noise-only components and the remaining chips start with signal plus noise components. Assuming that the statistics of the signal paths do not change in the uncertainty region, we can express different hypotheses approximately as follows:

$H_0: z_i = \eta_i, i = n_s, \ldots, n_f,$ $H_k: z_i = \eta_i, i = n_s, \ldots, k-1,$ $z_i = N_2\sqrt{E}\alpha_{i-k+1} + \eta_i, i = k, \ldots, n_f, \quad (12)$ for $k \in U$, where $\eta_n$'s denote the i.i.d. output noise distributed as $N(0, \sigma_n^2)$, and $\sigma_n^2 = N_2 N_0/2$, $\alpha_1, \ldots, \alpha_{n_f-k+1}$ are independent channel coefficients, assuming $n_f - n_s + 1 \leq L$, and $n_f = n_e + M_2$, with $M_2$ being the number of combination outputs that are considered out of the uncertainty region in order to have reliable estimates of the unknown parameters of $\alpha$.

Due to very high resolution of UWB signals, it is appropriate to model the channel coefficients approximately as $$\alpha_1 = d_1 |\alpha_1|, \quad (13)$$

$$\alpha_l = \begin{cases} d_l |\alpha_l|, & p \\ 0, & 1-p \end{cases}, l = 2, \ldots, n_f - n_s + 1,$$

where p is a probability that a channel tap arrives in a given chip, $d_l$ is the phase of $\alpha_l$, which is ±1 with equal probability, and $|\alpha_l|$ is the amplitude of $\alpha_l$, which is modeled as a Nakagami-m distributed random variable with parameter $\Omega$; that is, $$p(\alpha) = \frac{2}{\Gamma(m)} \left(\frac{m}{\Omega}\right)^m \alpha^{2m-1} e^{-\frac{m\alpha^2}{\Omega}}, \quad (14)$$

for $\alpha \geq 0$, $m \geq 0.5$ and $\Omega \geq 0$, where $\Gamma$ is the Gamma function.

According to equation (12), the TOA estimation problem can be considered as a change detection problem. Let $\theta$ denote the unknown parameters of the distribution of $\alpha$; that is, $\theta = [p \ m \ \alpha]$. Then, the log-likelihood ratio (LLR) is determined as:

$$S_k^{n_f}(\theta) = \sum_{i=k}^{n_f} \log \frac{p_\theta(z_i|H_k)}{p(z_i|H_0)}, \quad (15)$$

where $p_\theta(z_i|H_k)$ denotes the probability distribution function (p.d.f) of the correlation output under hypothesis $H_k$, with unknown parameters given by $\theta$, and $p(z_i|H_0)$ denotes the p.d.f. of the correlation output under hypothesis $H_0$. Because $\theta$ is unknown, the maximum likelihood (ML) estimate can be obtained first for a given hypothesis $H_k$ and then that estimate can be used in the LLR expression. In other words, the generalized LLR approach can be taken, where the TOA estimate is expressed as $$\hat{k} = \underset{k \in U}{\operatorname{argmax}} S_k^{n_f}(\hat{\theta}_{ML}(k)), \quad (16)$$

where $$\hat{\theta}_{ML}(k) = \underset{\theta}{\operatorname{argsup}} S_k^{n_f}(\theta). \quad (17)$$

However, the ML estimate is usually complicated. Therefore, simpler estimators, such as a method of moments (MM) estimator can be used to obtain the parameters. The nth moment of a random variable X having the Nakagami-m distribution with parameter $\Omega$ is given by $$E\{X^n\} = \frac{\Gamma(m + n/2)}{\Gamma(m)} \left(\frac{\Omega}{m}\right)^{n/2}. \quad (18)$$

Then, from the correlator outputs $\{z_i\}_{i=k+1}^{n_f}$, the MM estimates for the unknown parameters can be determined by:

$$p_{MM} = \frac{\gamma_1 \gamma_2}{2\gamma_2^2 - \gamma_3}, \ m_{MM} = \frac{2\gamma_2^2 - \gamma_3}{\gamma_3 - \gamma_2^2}, \ \Omega_{MM} = \frac{2\gamma_2^2 - \gamma_3}{\gamma_2}, \quad (19)$$

where $$\gamma_1 \triangleq \frac{1}{EN_2^2}(\mu_2 - \sigma_n^2), \quad (20)$$

$$\gamma_2 \triangleq \frac{1}{E^2 N_2^4}\left(\frac{\mu_4 - 3\sigma_n^4}{\gamma_1} - 6EN_2^2 \sigma_n^2\right),$$

$$\gamma_3 \triangleq \frac{1}{E^3 N_2^6}\left(\frac{\mu_6 - 15\sigma_n^6}{\gamma_1} - 15E^2 N_2^4 \gamma_2 \sigma_n^2 - 45EN_2^2 \sigma_n^4\right),$$

with $\mu_j$ denoting the jth sample moment given by $$\mu_j = \frac{1}{n_f - k} \sum_{i=k+1}^{n_f} z_i^j. \quad (21)$$

Then, the chip having the first signal path can be obtained as $$\hat{k} = \underset{k \in U}{\operatorname{argmax}} S_k^{n_f}(\hat{\theta}_{MM}(k)), \quad (22)$$

where $\theta_{MM}(k) = [p_{MM} \ m_{MM} \ \Omega MM]$ is the MM estimate for the unknown parameters.

Let $p_1(z)$ and $p_2(z)$, respectively, denote the distributions of $\eta$ and $N_2\sqrt{E}d|\alpha|+\eta$. Then, the generalized LLR for the $k^{th}$ hypothesis is given by $$S_k^{n_f}(\hat{\theta}) = \log \frac{p_2(z_k)}{p_1(z_k)} + \sum_{i=k+1}^{n_f} \log \frac{pp_2(z_i) + (1-p)p_1(z_i)}{p_1(z_i)}, \quad (23)$$

where

-continued $$p_1(z) = \frac{1}{\sqrt{2\pi}\,\sigma_n} e^{-\frac{z^2}{2\sigma_n^2}} \quad (24)$$

and $$p_2(z) = \frac{v_1}{\sqrt{2\pi}\,\sigma_n} e^{-\frac{z^2}{2\sigma_n^2}} \Phi\left(m, \frac{1}{2}; \frac{z^2}{v_2}\right), \quad (25)$$

with $$v_1 \triangleq \frac{2\sqrt{\pi}\,\Gamma(2m)}{\Gamma(m)\Gamma(m+0.5)} \left(4 + \frac{2EN_2^2\Omega}{m\sigma_n^2}\right)^{-m}, \quad (26)$$

$$v_2 \triangleq 2\sigma_n^2 \left(1 + 2m \frac{\sigma_n^2}{EN_2^2\Omega}\right),$$

and $\Phi$ denoting a confluent hypergeometric function given by [7]

$$\Phi(\beta_1, \beta_2; x) = \quad (27)$$

$$1 + \frac{\beta_1}{\beta_2}\frac{x}{1!} + \frac{\beta_1(\beta_1+1)}{\beta_2(\beta_2+1)}\frac{x^2}{2!} + \frac{\beta_1(\beta_1+1)(\beta_1+2)}{\beta_2(\beta_2+1)(\beta_2+2)}\frac{x^3}{3!} + \cdots$$

Note that the p.d.f. of $N_2\sqrt{E}d|\alpha|+\eta, p_2(z)$, is obtained from equations (14), (24) and the fact that d is ±1 with equal probability.

The TOA estimation rule can be expressed as $$\hat{k} = \underset{k \in u}{\arg\max} \left\{ \log\left[v_1 \Phi\left(m, 0.5; \frac{z_k^2}{v_2}\right)\right] + \right.$$

$$\left. \sum_{n=k+1}^{n_f} \log\left[pv_1 \Phi\left(m, 0.5; \frac{z_k^2}{v_2}\right) + 1 - p\right] \right\}. \quad (28)$$

Note that equation (12) assumes that the block always starts with noise-only components, followed by the arriving signal. However, in practice, there can be cases where the first step determines a block of all noise components. By combining large number of frames; that is, by choosing a large $N_1$ in equation (7), the probability of selecting a block 301 having only noise can be reduced. However, a large $N_1$ also increases the estimation time. Hence, there is a trade-off between the estimation error and the estimation time.

In order to prevent erroneous TOA estimation when a noise-only block is selected, a one-sided test can be applied using the known distribution of the noise outputs. Because the noise outputs have a Gaussian distribution, the test compares the average energy of the outputs after the estimated change instant to a threshold.

In other words, if $$\frac{1}{n_f - \hat{k} + 1} \sum_{i=\hat{k}}^{n_f} z_i^2 < \delta_1,$$

then the block is considered a noise-only block, and the two-step process is repeated.

Another improvement of the invention can be achieved by checking whether the block 301 includes signal from all paths; that is, determining if the fine TOA is actually prior to block 301. Again, by following a one-sided test approach, we can check the average energy of the correlation outputs before the estimated TOA against a threshold and detect an all-signal block if the threshold is exceeded.

However, for very small values of the TOA estimate $\hat{k}$, there can be a significant probability that the signal from the first path arrives before the current observation region because the distribution of the correlation output after the first path includes both the noise distribution and the signal plus noise distribution with some probabilities as expressed by equation (13).

Hence, the test can fail even though the block is an all-signal block. Therefore, some additional correlation outputs before $\hat{k}$ can be employed as well when calculating the average power before the TOA estimate. In other words, if $$1\frac{1}{\hat{k} - n_s + M_3} \sum_{i=n_s-M_3}^{\hat{k}-1} z_i^2 > \delta_2,$$

the block is considered as an all-signal block, where $M_3 \geq 0$ additional outputs are used depending on $\hat{k}$.

When it is determined that the block includes all signal outputs, the TOA is expected to be in one of the previous blocks. Therefore, the uncertainty region, i.e., the observation block, is shifted backwards, and the change detection method is repeated.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for estimating a time of arrival (TOA) of an ultra wide band (UWB) signal received in a wireless communication system, comprising:

measuring an energy in a frame of the UWB received signal to determine a block in the frame, the block representing a coarse time of arrival of the UWB received signal; and combining a plurality of time-delayed versions of a template signal with the block of the UWB received signal to select a particular template signal, the particular template signal identifying a particular chip representing a fine time of arrival of the UWB received signal, and in which the template signal is a transmitted signal corresponding to the UWB received signal, in which the fine TOA of the UWB received signal, $\tau_{TOA}$, is represented by is $\tau_{TOA} = kT_c = k_b T_b + k_c T_c$, and where $k \in [0, N_c - 1]$ is the TOA in terms of the pulse duration $T_c$, $N_c$ is the number of chips per frame interval, $T_b$ is the block interval including B pulses ($T_b = BT_c$), and $k_b \in [0, N_c B - 1]$, and $k_c \in [0, B-1]$ are integers that determine, respectively, in which block and pulse the UWB signal is received via a first signal path.

2. The method of claim 1, in which the time delays correspond to an interval of one-chip.

3. The method of claim 1, in which the combining produces a set of combined values, the set having one combined value for each combination of the template signal with the UWB received signal.

4. The method of claim 3, further comprising: selecting the particular template signal associated with the combined value that matches a correlation value to identify the chip that represents the fine time of arrival of the UWB received signal.

5. A method for estimating a time of arrival (TOA) of an ultra wide band (UWB) signal received in a wireless communication system, comprising:
receiving the ultra wide band (UWB) signal, in which the UWB signal includes a plurality of frames, and each frame includes a plurality of blocks, and each block includes a plurality of UWB pulses;
measuring an energy of the pulses in each block to determine an energy of each block in the frame;
selecting the block with a highest energy as a coarse time of arrival (TOA) of the received UWB signal;
combining a plurality of time-delayed versions of a template signal with the selected block of the received (UWB) signal to select a particular template signal, the particular template signal identifying a particular pulse representing a fine TOA of the received UWB signal, in which the UWB signal is represented by:

$$s_{tx}(t) = \sqrt{E} \sum_{j=-\infty}^{\infty} a_j b_{\lfloor j/N_f \rfloor} w_{tx}(t - jT_f - c_j T_c),$$

where $w_{tx}(t)$ is a transmitted pulse having a duration $T_c$, E is a transmitted pulse energy, $T_f$ is a frame time, $N_f$ is a number of pulses representing one information symbol, $T_s = N_f T_f$ is a symbol interval, and $b_{\lfloor j/N_f \rfloor} \in \{+1, -1\}$ is a binary information symbol, and the received (UWB) signal is $$r(t) = \sum_{l=1}^{L} \sqrt{E} \, \alpha_l s_{rx}(t - (l-1)T_c - \tau_{TOA}) + n(t),$$

where $\alpha_l$ is a channel coefficient for an $l^{th}$ path, L is a number of multipath components, $\tau_{TOA}$ is the fine TOA of the received (UWB) signal, and n(t) is noise, and where $$s_{rx}(t) \text{ is } s_{rx}(t) = \sum_{j=-\infty}^{\infty} a_j b_{\lfloor j/N_f \rfloor} w_{rx}(t - jT_f - c_j T_c),$$

with $w_{rx}(t)$ denoting a received UWB pulse with unit energy and a training sequence is $b_j = 1 \forall_j$.

6. The method of claim 5, in which the time delays correspond to an interval of one-chip.

7. The method of claim 5, in which the fine TOA is an integer multiple of the pulse duration $T_c$.

8. The method of claim 7, further comprising:
obtaining a sub-pulse TOA resolution by employing a delay-lock-loop (DLL) after estimating the fine TOA.

* * * * *